United States Patent
Griessbach

(10) Patent No.: US 7,152,137 B2
(45) Date of Patent: Dec. 19, 2006

(54) METHOD FOR EXCHANGING DATA BETWEEN A PLURALITY OF SUBSCRIBERS BY MEANS OF A DATA BUS

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 109 days.

(21) Appl. No.: 10/296,344

(22) PCT Filed: May 12, 2001

(86) PCT No.: PCT/EP01/05434

§ 371 (c)(1),
(2), (4) Date: Aug. 15, 2003

(87) PCT Pub. No.: WO01/91381

PCT Pub. Date: Nov. 29, 2001

(65) Prior Publication Data

US 2004/0019727 A1    Jan. 29, 2004

(51) Int. Cl.
*G06F 13/00*    (2006.01)
(52) U.S. Cl. ........................ 710/316; 710/317; 710/311
(58) Field of Classification Search ........ 710/316–317, 710/240–244, 100, 311
See application file for complete search history.

(56) References Cited

U.S. PATENT DOCUMENTS

| | | | |
|---|---|---|---|
| 5,907,486 A | 5/1999 | Ying | |
| 5,958,033 A * | 9/1999 | Schubert et al. | 710/300 |
| 6,023,232 A | 2/2000 | Eitzenberger | 340/988 |
| 6,032,203 A | 2/2000 | Heidhues | |
| 6,182,178 B1 * | 1/2001 | Kelley et al. | 710/314 |
| 6,292,862 B1 * | 9/2001 | Barrenscheen et al. | 710/306 |
| 6,618,777 B1 * | 9/2003 | Greenfield | 710/120 |

FOREIGN PATENT DOCUMENTS

| | | |
|---|---|---|
| DE | 197 22 115 A1 | 5/1997 |
| DE | 197 22 115 | 12/1998 |
| DE | 198 05 464 | 8/1999 |
| WO | WO 00/07335 | 2/2000 |
| WO | WO 00/07849 | 2/2000 |

OTHER PUBLICATIONS

"FieldBuss Brings Protocol to Process Control" XP 000580299, 8045 IEEE Spectrum 33(1996) Mar., No. 3, New York, US, Mike Santori and Kurt Zech.
"Aspects and Issues of Multiple Vehicle Networks" XP002062363, Bruce D. Emaus, pp. 79-94.
"G.M.'s Approach to SAE J1850: Class 2" XP000216482—372 Automotive Engineereing 99(1991) Mar., No. 3, Warrendale, PA, US; p. 37-42.

(Continued)

*Primary Examiner*—Rehana Perveen
*Assistant Examiner*—Kim T. Huynh
(74) *Attorney, Agent, or Firm*—Crowell & Moring LLP

(57) ABSTRACT

The invention relates to a method for exchanging data between a plurality of subscribers (K1, K2, K3, K) by means of a data bus. The subscribers are located in their totality in at least two spatially and physically separate subordinate data buses and exchange, in the interval in which the more rapid data bus is not busy, data via control devices that are associated with every subordinate data bus and that are interconnected via a more rapid data bus.

11 Claims, 1 Drawing Sheet

OTHER PUBLICATIONS

Which Bus Architecture Is Best For You?, Chad Chesney, XP 000910354, Data Acquisition, p. 13-19.

"Netzwerke zur Integration von Systemfunktionen der Kraftfahrzeug-Elektronik" Thomas Raith et al, XP 000597627, Informationstechnik und Technische Informatick 37 (1995) 6, p. 28-35.

"Mit dem Worst Case Kalkuliert" Matthias Staub, Elektronik Dec. 1995, p. 86-91.

"Automatisieren in der Produktion", Dr. -Ing. Peter Grafoner, 2087 Elektronik 41 (1992) Mar. 17, No. 6, Munchen, DE, p. 38-44.

International Search Report and translation of relevant portions thereof.

* cited by examiner

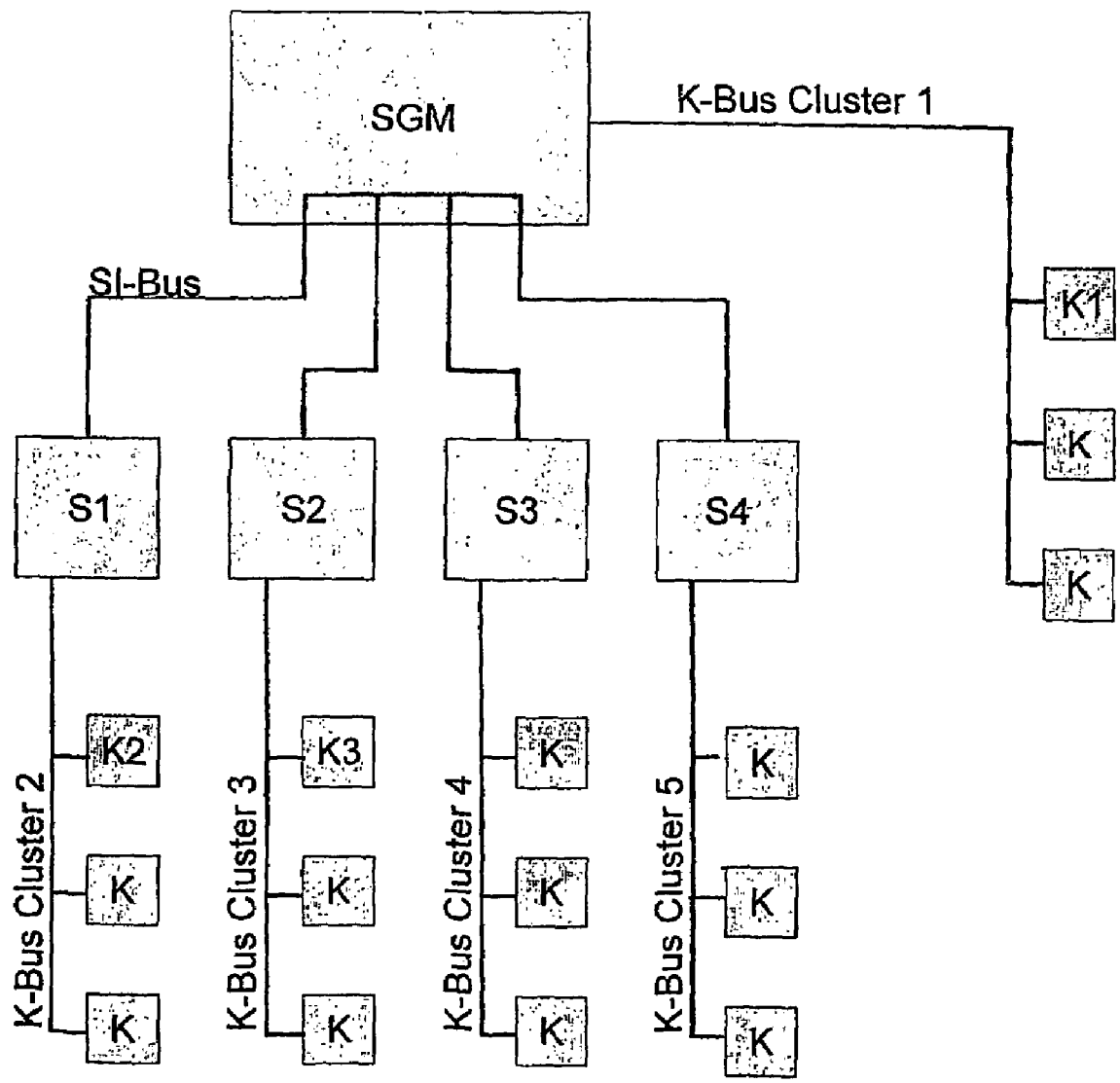

METHOD FOR EXCHANGING DATA BETWEEN A PLURALITY OF SUBSCRIBERS BY MEANS OF A DATA BUS

BACKGROUND AND SUMMARY OF THE INVENTION

This application claims the priority of German patent document 100 26 245.7, filed 26 May 2000 (PCT International Application PCT/EP01/05434, filed 12 May 2001), the disclosure of which is expressly incorporated by reference herein.

This application is related to co-pending U.S. patent application Ser. No. 10/296,343, filed Jul. 24, 2003.

The invention relates to a method and a network for exchanging data between a plurality of subscribers via a data bus.

Modern vehicles frequently include several (preferably standardized) data buses. For engine and chassis components, for example, one system is used which is adapted to that application, while another suitably designed bus system is used for audio and telecommunication peripheries. Data exchange between the different bus systems takes place by way of a plurality of gateways.

An attempt to transfer this bus system architecture which is used in higher-priced vehicles to vehicles of the lower cost, however, results in high expenditures, due on the one hand, to the high costs of the standard bus for engine and chassis components and, on the other hand, to the cost of a gateway. The construction of a separate onboard network structure for lower priced vehicles is problematic in that it is largely impossible to take over individual components of the higher-priced vehicles because of a lack of compatibility. In addition, a conflict arises due to differing goals. To lower the cost, the transmission rate can be reduced and the number of bus subscribers can be increased, which results in long response times and low flexibility, because subscriber numbers differ from one vehicle to the next. Every addition of a new subscriber (for example, as a result of a subsequently installed component) requires considerable adaptation expenditures.

It is an object of the invention to provide a highly efficient method of exchanging data between several subscribers via a data bus which can serve a plurality of subscribers that vary in a vehicle-specific manner.

The onboard network structure according to the invention is modular and cost-effective. It permits the use of the same basic components in all vehicles covering several model series of a manufacturer. The higher-quality vehicles can be arbitrarily equipped with additional components, without being more expensive than comparable series systems.

A prerequisite for the invention is the existence of a faster data bus, such as for example the data bus described in German Patent Documents DE 19636441 A and DE 19636442 A. This data bus is distinguished by a transmission rate of more than 5 Mbits/s and is suitable, for example, for passive safety systems, such as air bags, belt tighteners, and the like, as well as the pertaining sensor system and actuators and their control units.

The control units are situated at different points of the vehicle (for example, in the area of the transmission tunnel or the B-columns, in the door or at the steering column). All such control units are connected with the data bus which, in normal situations (that is, outside a crash phase or serious misuse phase), is not utilized to a great degree. The same applies to the utilization of the processors in the control units.

According to the invention, these control units are also used for other functions. These functions are part of a different function periphery, for example, the electronic system of the vehicle body, and relate, for example, to the light control, the wiper control, the central locking system and the window lift mechanism control.

The light control and the wiper control, on the one hand, and the central locking system and the window lift mechanism control, on the other hand, are each a component of a subordinate data bus. Because of the minimized number of subscribers (in the case of the light control, for example, one control unit and 10 connected subscribers), the subordinate data bus has a sufficient response time and is also operable at a low transmission rate. That is, it rapidly and securely provides the connected subscribers with the required data, or it to be provided. As a result it is possible to connect control units in the electronic system of the vehicle body (with higher demands on the communication) directly to the faster data bus.

With such an onboard network structure, the need for a separate data bus for the components of the electronic system of the vehicle body is eliminated, because these components are connected to the faster data bus, either directly or via otherwise existing control units. This results in the elimination of the gateway functionality, and thus of separate gateways.

Other objects, advantages and novel features of the present invention will become apparent from the following detailed description of the invention when considered in conjunction with the accompanying drawings.

BRIEF DESCRIPTION OF THE DRAWINGS

The single FIGURE shows a data bus structure according to the invention and an onboard network system of a vehicle implemented thereby, and the communication process implemented thereby is described.

DETAILED DESCRIPTION OF THE DRAWINGS

The block diagram illustrated in the FIGURE includes, among other things, a control unit module SGM and control units S1 to S4. In their entirety, these components are part of a passive safety system and are connected by a faster data bus "Sl bus" having a transmission rate of, for example, 5 Mbits/s. A plurality of control units "K" are connected to the control units S1–S4, and separately form subordinate data buses K-bus cluster 1, K-bus cluster 2, K-bus cluster 3, . . . , which are coupled respectively to the control units S1 to S4 as well as to the control unit module SGM. The components SGM and S1 to S4 therefore contain the functions of the passive safety system as well as the basic functions of the electronic system of the vehicle body. (Within the subordinate data buses, several control units K are separately marked K1, K2 and K3 for the purpose of further explanation.)

With respect to the basic functions of the electronic system of the vehicle body, the control units SGM and S1 to S4 adapt the format of the data of the subordinate data bus subscribers to the data format of the faster data bus, or vice versa. They also control the feeding of data from the subordinate data bus subscribers to the faster data bus, and guide the data of the subscribers of the other subordinate data buses to the subscribers of their connected subordinate data bus. For this purpose, the data of all subscribers of both the subordinate data bus and the faster data bus are provided with an unambiguous identification. The identifications of the subscribers of the connected subordinate data bus are stored in the respective control unit.

One advantage of the data bus structure according to the invention is that the number of messages per subordinate data bus is significantly lower than in the case of a data bus with only one branch. Moreover, as a result of the small number of subscribers, the waiting time to a possible bus access is short.

In order to provide a system which is as flexible as possible, it is necessary that subordinate data bus subscribers (in the case of K-bus subscribers) basically have access to all required information of the overall system. In addition, it should be possible without any basic change to "clamp over" a K-bus subscriber from one subordinate data bus to another. As a result, it is possible, for example, to place a window lifter switch block in one vehicle series in the door and in the other vehicle series on the center console.

The K-bus addresses are unambiguous throughout the entire system. The corresponding K-bus messages are transposed according to a fixed rule, to bus messages of the faster data bus with corresponding IDs. In the control units SGM and S1 to S4, encodable "mini-gateway tables" then cause the transposition of only messages which are needed in the respective subordinate data bus. Therefore, for the "transfer" of one control unit K from one subordinate data bus to another, only these gateway tables need then be recoded. The overall system behavior therefore remains absolutely unchanged.

The data exchange within the overall system is explained by an example. For transmission of a K-bus message TK1 from subscriber K1 at the K-bus cluster 1 to subscriber K2 at the K-bus cluster 2, K1 sends message TK1 to K-bus cluster 1, triggered, for example, by a pressure on a key. SGM receives TK1 and wraps the message TK1 into the data field of an Sl bus message. Each Sl bus subscriber receives TK1 in the Sl bus format and checks in its gateway table whether TK1 is to be transmitted to its pertaining K-bus cluster. S1 unwraps TK1 from the Sl bus format and transmits TK1 to the K-bus cluster 2. K2 receives TK1.

If the messages of the K-bus subscribers have a longer length than that of the data of the Sl bus (for example, 32 bytes of useful data in comparison to 12 bytes of useful data), a segmented (that is, repeated) transmission of defined telegram parts is required.

If, for any reason, not K2 but K3 is to receive the TK1, TK1 needs only be deleted from the gateway table of S1 and be entered into the gateway table of S2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of exchanging data between a plurality of subscribers via a data bus, wherein:
    said subscribers are arranged in at least first and second spatially and physically separate subordinate data buses;
    control units are assigned to each subordinate data bus and are mutually connected by way of a third data bus;
    said subscribers exchange data via said assigned control units and said third data bus, at times when the third data bus is not busy; and
    the third data bus has a faster transmission capacity than the first and second subordinate data buses.

2. The method according to claim 1, wherein the control units adapt a format of data of the subordinate data bus subscribers to a data format of the faster data bus, or vice versa.

3. The method according to claim 1, wherein each of the subordinate data bus subscribers and subscribers of the faster data bus has an unambiguous identification.

4. The method according to claim 3, wherein an identification of each of the subscribers of the connected subordinate data bus is stored in a control unit to which it is coupled.

5. The method according to claim 3, wherein the identification of the subscribers of not connected subordinate data buses are stored in the respective control unit.

6. The method according to claim 3, wherein the identification of the not connected subscribers are contained in a programmable memory.

7. Method according to claim 6, wherein data transmission from the subordinate data bus to the faster data bus and vice-versa is controlled by means of memory content.

8. A data network structure for a vehicle, comprising:
    a primary data bus having a first data transmission rate capacity;
    a plurality of control units connected via said primary data bus;
    a plurality of subordinate data buses, each having a second data transmission rate capacity that is smaller than said first data transmission rate capacity and being physically and spatially separated from other subordinate data buses, one such subordinate data bus being connected to each respective control unit; and
    a plurality of subscribers connected to each of said subordinate data buses,
    wherein said subscribers to said subordinate data buses exchange data via said primary data bus and the control units to which said subscribers are coupled, during periods when said primary data bus is not otherwise in use.

9. The data network structure for a vehicle according to claim 8, wherein:
    each of said subscribers has a unique identification code; and
    each of said control units has an encodable table containing information from transposition of only messages directed to the subordinate data bus connected thereto.

10. The method according to claim 1, wherein said control units comprise at least first and second control units, one such control unit being connected to each of said first and second subordinate data buses, respectively.

11. A method of exchanging data among a plurality of subscribers via a data communication network, wherein:
    each of said subscribers is connected in data communication with one of at least two spatially and physically separate subordinate data buses which are included in said data communication network;
    said data communication network, further includes at least two control units which are connected in data communication with each other via a primary data bus, one such control unit being connected to each of said subordinate data buses, respectively;
    said subscribers exchange data via said control units and said primary data bus at times when said primary data bus is not busy; and
    said primary data bus has a faster transmission capacity than the subordinate data buses.

* * * * *